(12) United States Patent
Lee et al.

(10) Patent No.: US 10,120,418 B2
(45) Date of Patent: Nov. 6, 2018

(54) PORTABLE KEYBOARD

(71) Applicant: LG ELECTRONICS INC., Seoul (KR)

(72) Inventors: Seungjin Lee, Seoul (KR); Keetae Kim, Seoul (KR); Dongguk Kang, Seoul (KR); Hojung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 15/204,712

(22) Filed: Jul. 7, 2016

(65) Prior Publication Data

US 2016/0320807 A1 Nov. 3, 2016

Related U.S. Application Data

(63) Continuation of application No. 14/627,663, filed on Feb. 20, 2015, now Pat. No. 9,411,381, which is a
(Continued)

(30) Foreign Application Priority Data

Oct. 31, 2011 (KR) ........................ 10-2011-0112103

(51) Int. Cl.
*H05K 7/00* (2006.01)
*H05K 5/00* (2006.01)
(Continued)

(52) U.S. Cl.
CPC .......... *G06F 1/1666* (2013.01); *G06F 1/1698* (2013.01); *G06F 3/0221* (2013.01)

(58) Field of Classification Search
CPC ....................................................... G06F 3/02
(Continued)

(56) References Cited

U.S. PATENT DOCUMENTS 8,757,908 B2    6/2014   Wu et al.
2003/0099086 A1*  5/2003   Chuang ................ G06F 3/0221
                                                          361/679.16
(Continued)

FOREIGN PATENT DOCUMENTS

CN         201974760 U       9/2011
KR    10-2008-0047643 A      5/2008
(Continued)

OTHER PUBLICATIONS

Notice of Allowance for grand-parent U.S. Appl. No. 13/567,359 dated Nov. 21, 2014.
(Continued)

*Primary Examiner* — Jerry Wu
(74) *Attorney, Agent, or Firm* — KED & Associates LLP

(57) ABSTRACT

A portable keyboard is disclosed, by which portability can be enhanced with a simple configuration. The present invention includes a plurality of key assemblies, a body part and a flexible connecting member. When the portable keyboard is carried, a plurality of the key assemblies are rolled up around an outer circumference of the body part in a manner that the flexible connecting member between a plurality of the key assemblies is folded. When the portable keyboard is used, a plurality of the key assemblies are unfolded by being rolled down centering on the body part in a manner that the flexible connecting member between a plurality of the key assemblies is unfolded.

20 Claims, 14 Drawing Sheets

Related U.S. Application Data continuation of application No. 13/567,359, filed on Aug. 6, 2012, now Pat. No. 9,019,694.

(51) Int. Cl.
 *G06F 1/16* (2006.01)
 *G06F 3/02* (2006.01)

(58) Field of Classification Search
 USPC .................................................. 361/679.01
 See application file for complete search history.

(56) References Cited

U.S. PATENT DOCUMENTS

| | | |
|---|---|---|
| 2005/0164752 A1 | 7/2005 | Lau et al. |
| 2009/0262492 A1 | 10/2009 | Whitchurch et al. |
| 2011/0311289 A1 | 12/2011 | Wu et al. |
| 2012/0009000 A1* | 1/2012 | Starrett ................. G06F 1/1632 400/472 |
| 2012/0194448 A1 | 8/2012 | Rothkopf |

FOREIGN PATENT DOCUMENTS

| | | |
|---|---|---|
| KR | 10-2011-0068712 A | 6/2011 |
| KR | 10-2011-0089234 A | 8/2011 |

OTHER PUBLICATIONS

Notice of Allowance for parent U.S. Appl. No. 14/627,663 dated Apr. 7, 2016.

* cited by examiner

PORTABLE KEYBOARD

CROSS-REFERENCE TO RELATED APPLICATIONS

This application is a Continuation Application of U.S. patent application Ser. No. 14/627,663, filed Feb. 20, 2015, which is a Continuation Application of U.S. patent application Ser. No. 13/567,359, filed Aug. 6, 2012 (now U.S. Pat. No. 9,019,694), the subject matters of which are incorporated herein by reference. Pursuant to 35 U.S.C. § 119(a), this application claims the benefit of earlier filing date and right of priority to Korean Application No. 10-2011-0112103, filed on Oct. 31, 2011, the contents of which are hereby incorporated by reference herein in their entirety.

BACKGROUND

1. Field

The present invention relates to a portable keyboard. Although the present invention is suitable for a wide scope of applications, it is particularly suitable for enhanced portability with a simple configuration.

2. Background

Recently, as mobile terminals including smart phones, tablet PC and the like are globally spread, many ongoing efforts are made to the research and development of a portable keyboard as an input device of a mobile terminal.

FIG. 1A is a layout and a perspective diagram of a folder type keyboard 10 according to a related art and FIG. 1B is a schematic diagram of a folded folder type keyboard 10 according to a related art.

Referring to FIG. 1A and FIG. 1B, a folder type keyboard 10 according to a related art consists of 5 bodies including a $1^{st}$ body 1a, a $2^{nd}$ body 1b, a $3^{rd}$ body 1c, a $4^{th}$ body 1d and a $5^{th}$ body 1e. In this case, the $1^{st}$ to $5^{th}$ bodies 1a to 1e are separated from each other in vertical direction and connected to one another via hinges 2. And, a plurality of keys 3 are provided to each of the bodies. In particular, the folder type keyboard 10 according to the related art is configured to be carried in a manner that the $1^{st}$ and $2^{nd}$ bodies 1a and 1b and the $4^{th}$ and fifth bodies 1d and 1e can be folded toward the $3^{rd}$ body 1c by being connected to left and right sides of the $3^{rd}$ body 1c via the hinges 2, respectively. Therefore, the folder type keyboard 10 can be carried in a shape similar to that of a book.

However, since the bodies of the related art folder type keyboard are separated from each other in the vertical direction, a hinge shaft configured to connect the separated bodies should zigzag to fit for the key arrangement shown in FIG. 1A, whereby a structure of the connecting part is inevitably complicated. And, as the hinge shaft has the zigzag configuration, when the folder type keyboard is folded to be carried, an exterior of the folded folder type keyboard is not elegant. Moreover, since a volume of the folder type keyboard in a folded state is similar to that of a normal book, the folder type keyboard has difficulty and/or inconvenience in portability and storage.

FIG. 2A is a perspective diagram of a portable keyboard 20 according to a related art and FIG. 2B is a schematic diagram of a rolled-up portable keyboard 20 according to a related art.

Referring to FIG. 2A and FIG. 2B, a portable keyboard 20 according to a related art consists of a body 21 formed of a flexible material (e.g., silicon) and a plurality of keys 22 built in one body of the body 21. Since the related art portable keyboard 20 is formed of silicon, it can be carried in a manner of being rolled up, as shown in FIG. 2B, thereby facilitating portability.

However, since the above-described portable keyboard 20 according to the related art includes the keys formed of silicon as well, when a user presses one of the keys, the pressed key fails to provide the user with a good sense or a good key recognition rate. Therefore, when a user uses the related art key board, it may be highly probable that a typographical error rate increases.

BRIEF DESCRIPTION OF THE DRAWINGS

The embodiments will be described in detail with reference to the following drawings in which like reference numerals refer to like elements wherein.

DETAILED DESCRIPTION

Figure 1A:
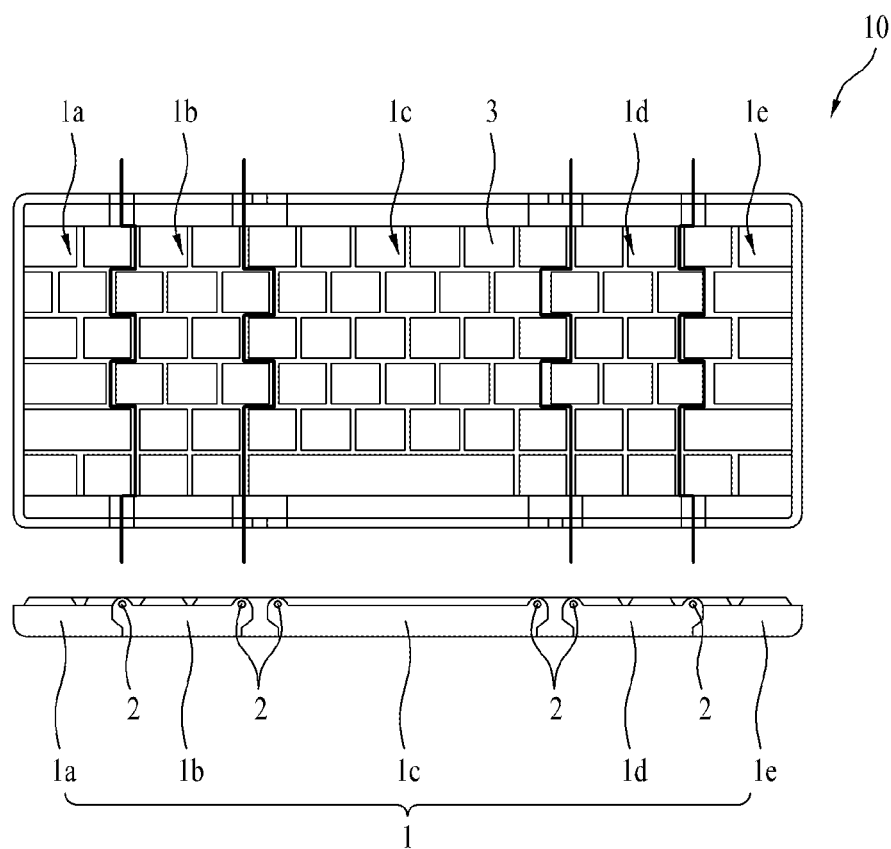
FIG. 1A is a layout and a perspective diagram of a folder type keyboard according to a related art.
Figure 1B:
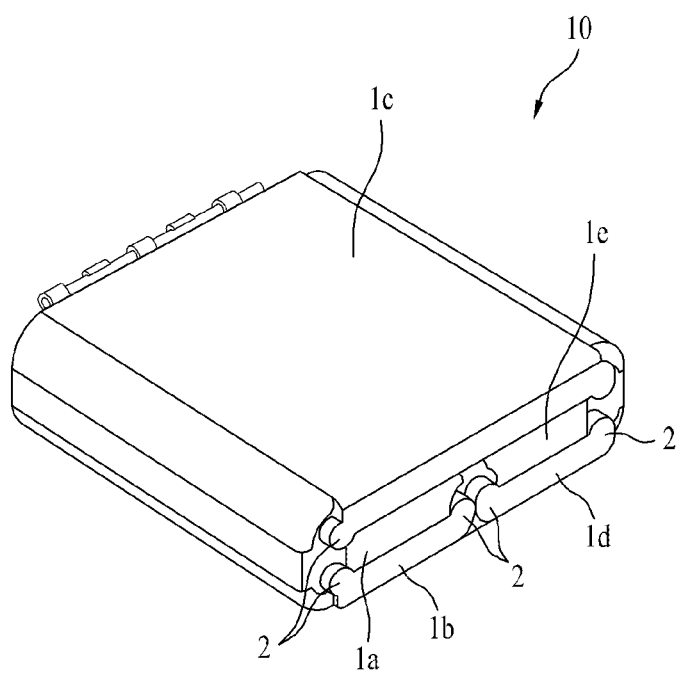
FIG. 1B is a schematic diagram of a folded folder type keyboard according to a related art.
Figure 2A:
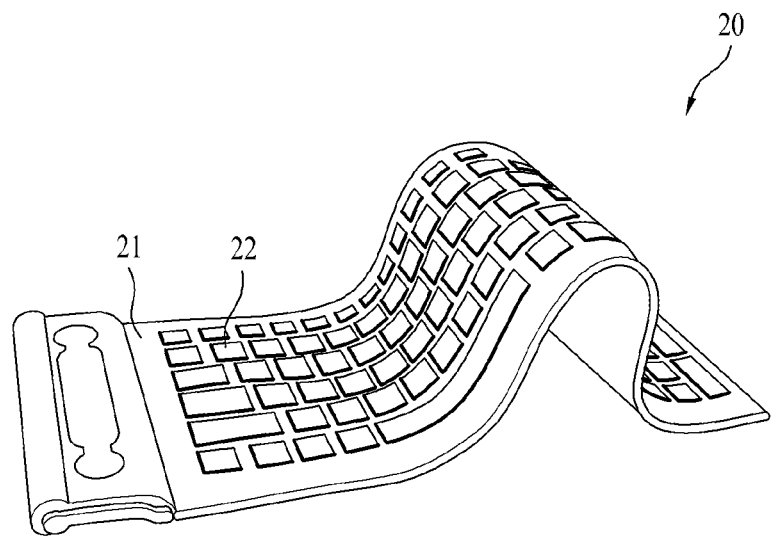
FIG. 2A is a perspective diagram of a portable keyboard 20 according to a related art.
Figure 2B:
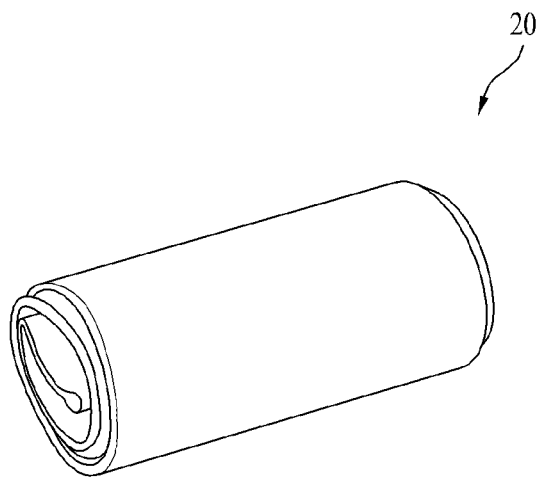
FIG. 2B is a schematic diagram of a rolled-up portable keyboard 20 according to a related art.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Wherever possible, the same reference numbers will be used throughout the drawings to refer to the same or similar parts and redundant descriptions of the same or similar parts will be omitted. Moreover, sizes and shapes of the respective parts shown in the drawings may be exaggerated or reduced.

Meanwhile, although a terminology including such an ordinal number as a first, a second and the like may be used in describing one of various components, the component may be non-limited by the corresponding terminology and the terminology is used to identify one component from the others only.

In case that a specific component is mentioned as 'connected to', 'mounted on' or 'installed at' a different component, the specific component may be directly connected to or mounted on the different component or may be understood as another component may exist in-between.

Figure 3:
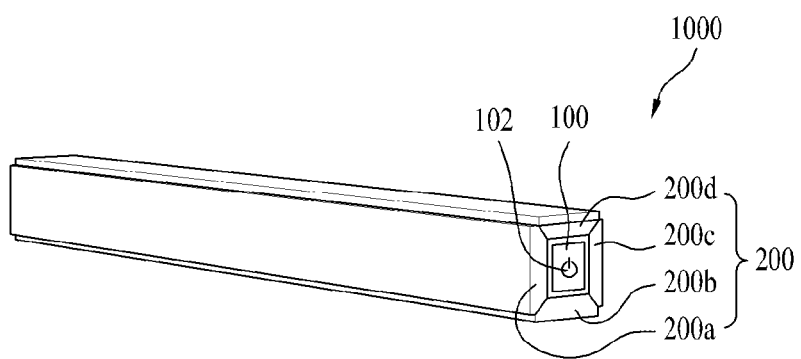
FIG. 3 is a schematic perspective diagram of a portable keyboard according to the present invention, in which the portable keyboard is folded.

FIG. 3 is a schematic perspective diagram of a portable keyboard 1000 according to the present invention, in which the portable keyboard is folded. And, FIG. 4 is a schematic perspective diagram of a portable keyboard 1000 according to the present invention, in which the portable keyboard is unfolded.

Figure 4:
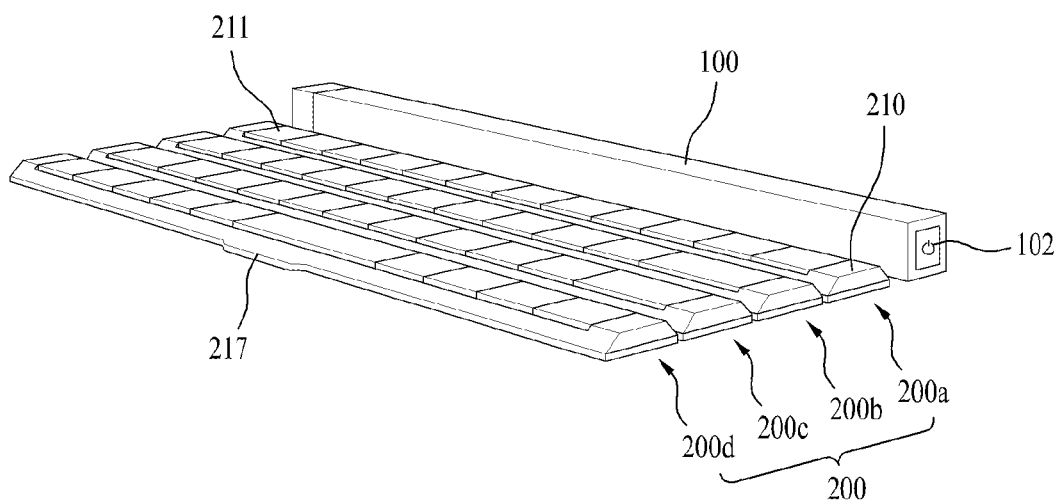
FIG. 4 is a schematic perspective diagram of a portable keyboard according to the present invention, in which the portable keyboard is unfolded.

Referring to FIG. 3 and FIG. 4, a portable keyboard 1000 according to the present invention may include an input unit 200 including a plurality of keys, a body part 100 controlling an input signal inputted from the input unit 200 and transmitting the controlled input signal to a mobile terminal (e.g., a smart phone, a tablet PC, etc.), and a flexible connecting member 300 connecting the input unit 200 and the body part 100 with each other electrically and/or mechanically.

Preferably, the portable keyboard 1000 according to the present invention may include a pantagraph type keyboard to slim down its overall size.

The input unit 200 includes a plurality of key assemblies and a plurality of the key assemblies are connected together via the flexible connecting member 300.

A plurality of the key assemblies include a plurality of keys or keytops arranged in a row in horizontal direction. And, an overall shape of a plurality of the key assemblies may include an elongated shape. In particular, each of a plurality of the key assemblies corresponds to a part separated from a normal keyboard with reference to keys in horizontal direction.

A plurality of the key assemblies may include the respective key assemblies. For instance, referring to FIG. 4, a plurality of the key assemblies may include a $1^{st}$ key assembly 200a, a $2^{nd}$ key assembly 200b, a $3^{rd}$ key assembly 200c and a $4^{th}$ key assembly 200d for example, by which the present invention is non-limited. Moreover, a plurality of the key assemblies may further include such an additional key assembly as a $5^{th}$ key assembly, a $6^{th}$ key assembly and the like for the usage of the portable keyboard 1000.

A plurality of the key assemblies may be rolled up to enclose the body part 100 in a manner that a plurality of the key assemblies are folded in-between, when the portable keyboard 1000 is carried or hand-held [cf. FIG. 3]. In order to use the portable keyboard 1000, a plurality of the key assemblies are unfolded in a manner of being rolled down centering on the body part 100 [cf. FIG. 4]. When a plurality of the key assemblies are folded in a manner of being rolled up, they are configured in a manner that top surfaces of a plurality of the key assemblies come in contact with an outer circumference of the body part (i.e., each face of the body part).

The body part 100 is situated side by side next to a lateral side of the key assembly (e.g., the $1^{st}$ key assembly 200a shown in FIG. 4) situated in a last row among a plurality of the key assemblies arranged side by side.

An unfolding protrusion 217 configured to protrude outward is provided to the key assembly (e.g., the $4^{th}$ key assembly 200d shown in FIG. 4) (i.e., the key assembly situated farthest from the body part 100 when a plurality of the key assemblies are unfolded), which is situated in a first row among a plurality of the key assemblies. As the unfolding protrusion 217 is provided, a plurality of the key assemblies can be easily unfolded using the unfolding protrusion 217 in the portable keyboard 1000 which is folded by being rolled up to be carried.

Since a magnet 261a is provided to an edge of each of the key assemblies, a plurality of the key assemblies can be fixed to each other while folded owing to the magnetic force of the magnets 216a in carrying the portable keyboard 1000. Thus, when the portable keyboard 1000 is carried, it can maintain a shape of an elongated n-polygonal cylinder without being unfolded.

Therefore, the present invention uses the magnetic force to prevent a plurality of the key assemblies from being unfolded without a separate fixing means and also simplifies a configuration or structure of the portable keyboard 1000.

The body part 100 may include a control unit configured to control an input signal inputted from the key assembly and a wireless communication module configured to transmit the input signal controlled by the control unit to the mobile terminal.

The body part 100 is connected with a plurality of the key assemblies by the flexible connecting member 300 mechanically and/or electrically.

A cross-section of the body part 100 is an equilateral n-polygon. In this case, the quantity of a plurality of the key assemblies amounts to n. For the usage of the keyboard (e.g., in accordance with a presence or non-presence of necessity for a function key or a special key), the quantity of a plurality of the key assemblies is determined. Once the quantity of a plurality of the key assemblies is determined, a cross-sectional shape of the body part 100 is determined as well. For instance, referring to FIG. 3 and FIG. 4, if 4 horizontal key rows are necessary, 4 key assemblies are provided and a cross-sectional shape of the body part 100 becomes a square.

Preferably, the body part 100 may have a horizontal length corresponding to a horizontal length of each of a plurality of the key assemblies.

The flexible connecting member 300 may have a dome switch 301 provided to a position of a top surface corresponding to each keytop 211. In this case, the flexible connecting member 300 connects a plurality of the key assemblies together mechanically and/or electrically and also connects a plurality of the key assemblies and the body part 100 together electrically and/or mechanically. In particular, the flexible connecting member 300 electrically connects a plurality of the key assemblies and the body part 100 together and mechanically connects a plurality of the key assemblies and the body part 100 together in a manner that a plurality of the key assemblies can enclose an outer circumference of the body part 100 by being connected with the body part 100.

To this end, the flexible connecting member 300 is provided with flexibility and may preferably include FPCB (flexible printed circuit board). The FPCB is mounted on one surface of the body part 100 and one surface of each of a plurality of the key assemblies can enclose the outer circumference of the body part 100 in carrying the portable keyboard 1000. In particular, the FPCB may play a role as a joint type connecting part between the body part 100 and each of the key assemblies.

The FPCB is provided with an outer surface layer. In particular, the outer surface layer may be preferably formed of one of polyethylene terephthalate (PET), polypropylene (PP), Kevlar and the like.

Thus, if the FPCB is used, the present invention does not need the complicated hinge mechanism of the related art. Therefore, the present invention simplifies the configuration or structure of the portable keyboard 1000 and correspondingly reduces a manufacturing time of the portable keyboard 1000 and a product cost.

The flexible connecting member 300 transmits input signals from a plurality of the key assemblies to the body part 100. In particular, the flexible connecting member 300 detects that the key of each of the key assemblies and then transmits an input signal corresponding to the pressed key to the body part 100.

Figure 5:
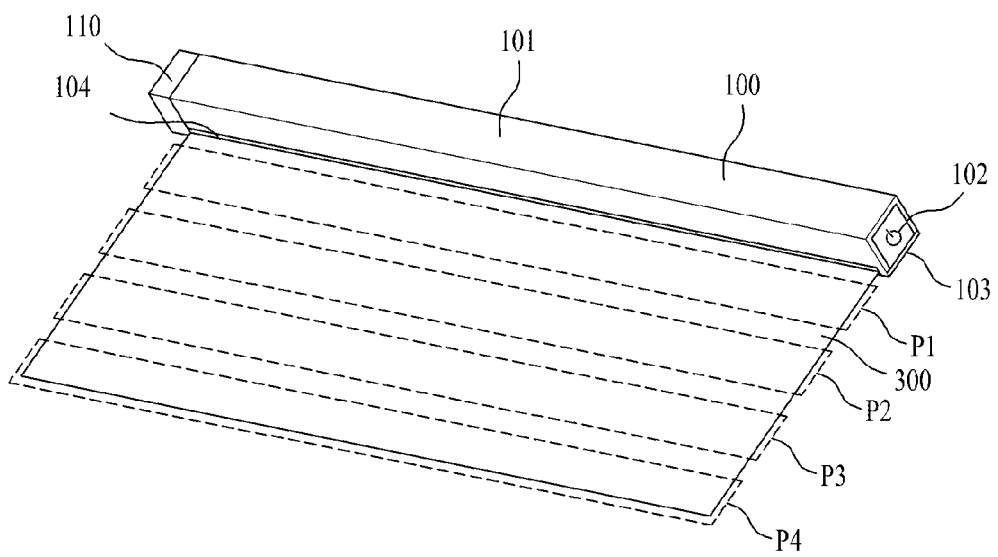
FIG. 5 is a schematic perspective diagram of a body part of a portable keyboard according to the present invention.
Figure 6:
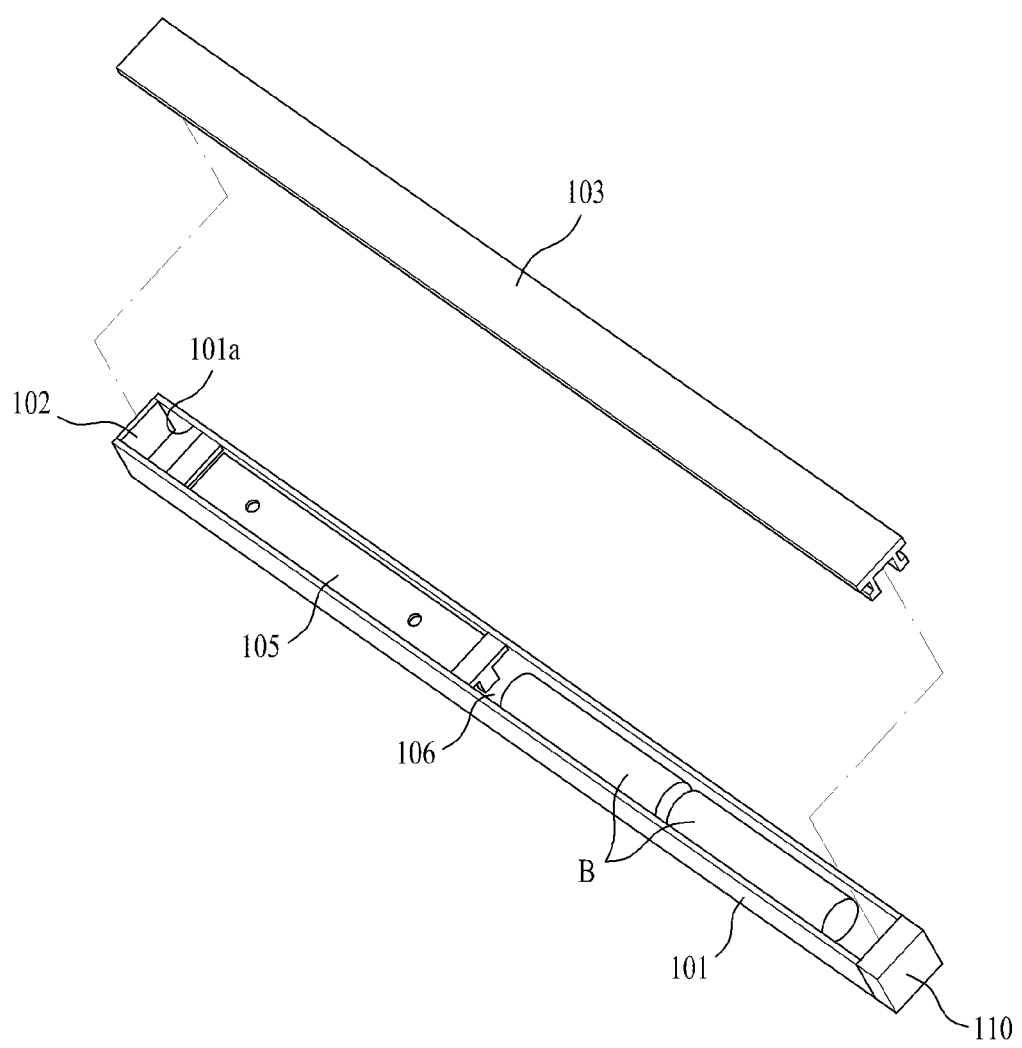
FIG. 6 is a schematic exploded perspective diagram of a body part of a portable keyboard according to the present invention.
Figure 7:
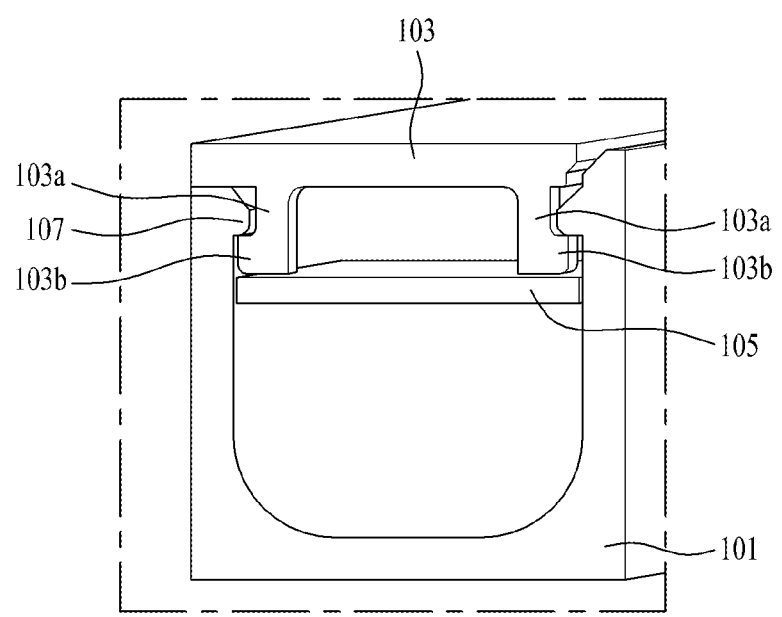
FIG. 7 is a schematic cross-sectional diagram of a body part of a portable keyboard according to the present invention.
Figure 8A:
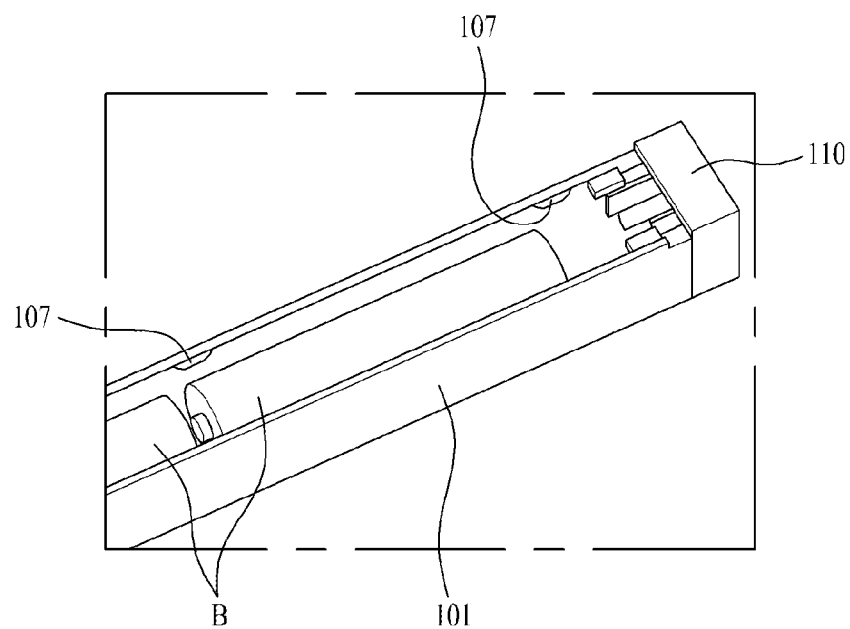
FIG. 8A and FIG. 8B are schematic partial diagrams of the interior of a body part of a portable keyboard according to the present invention.
Figure 8B:
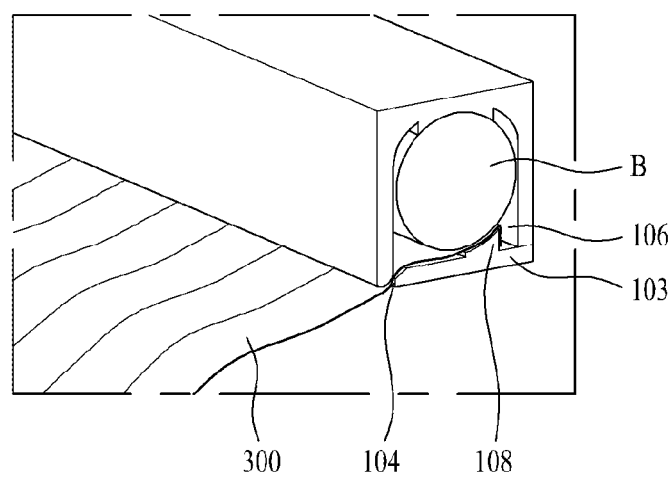
Figure 9A:
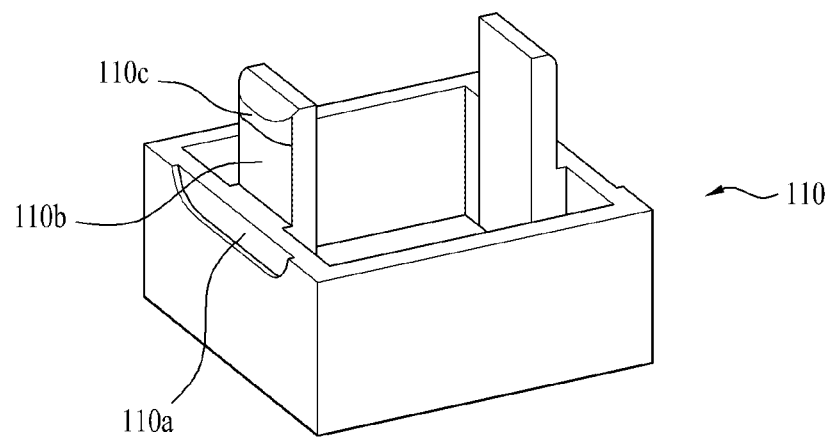
FIG. 9A and FIG. 9B are schematic perspective and cross-sectional diagrams of a battery cover of a portable keyboard according to the present invention.
Figure 9B:
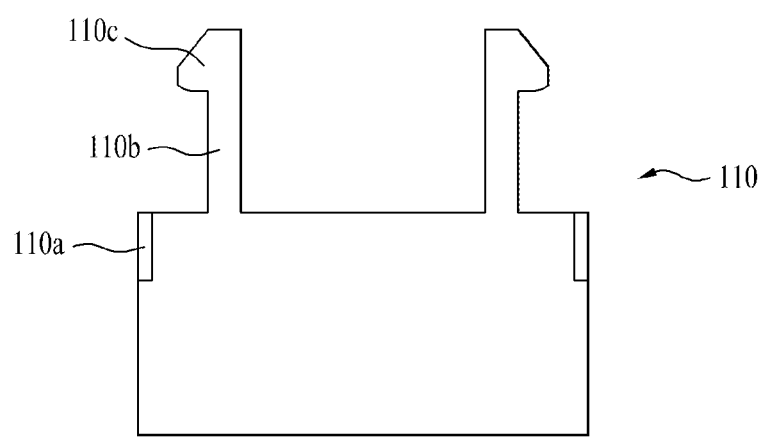

FIG. 5 is a schematic perspective diagram of a body part 100 of a portable keyboard according to the present invention. FIG. 6 is a schematic exploded perspective diagram of a body part 100 of a portable keyboard according to the present invention. FIG. 7 is a schematic cross-sectional diagram of a body part 100 of a portable keyboard according to the present invention. FIG. 8A and FIG. 8B are schematic partial diagrams of the interior of a body part 100 of a portable keyboard according to the present invention. FIG. 9A and FIG. 9B are schematic perspective and cross-sectional diagrams of a battery cover 110 of a portable keyboard according to the present invention.

Referring to FIG. 5 and FIG. 6, a body part 100 may include a housing 101 having a hollow type n-polygonal cylinder shape, a main printed circuit board (PCB) 105 installed in the housing 101, and a battery receiving part 106 provided within the housing 101 to receive a battery B for supplying power to the main printed circuit board 105.

In particular, the battery B may include a built-in battery B fixed within the housing 101. And, the built-in battery B can be charged with electricity via such a cable as a USB cable and the like. Alternatively, the battery B may include an external battery B detachably inserted in the housing 101.

On the main printed circuit board 105, mounted are a control unit controlling and/or processing an input signal inputted via the input unit 200 and a wireless communication module configured to transmit the input signal controlled or processed by the control unit to a mobile terminal.

In this case, the wireless communication module may preferably include at least one of a Bluetooth communication module, a ZigBee communication module, a Wi-Fi communication module and the like.

Referring to FIGS. 5 to 8B, the housing 101 of the body part 100 may include an opening 101a provided to a bottom side of housing 101, a housing cover 103 detachably attached to the housing 101 to cover the opening 101a, a battery opening configured to open one lateral side of the housing 101, a battery cover 110 detachably attached to the housing 101 to cover the battery opening, and a power button 102 provided to the other lateral side of the housing 101 to control ON/OFF of the portable keyboard 1000.

The housing 101 of the body part 100 may include the opening 101a configured to open the bottom side of the housing 101 and the housing cover 103 detachably attached to the housing 101 to cover the opening 101a.

A plurality of locking projections 107 are provided to the housing 101 in the vicinity of the opening 101a. The housing cover 103 includes a locking sill 103b configured to be detachably engaged with each of the locking projections 107. And, the locking sill 103b is provided to an end portion of a support portion 103a vertically extending from the housing cover 103. In particular, the support portion 103a is configured to have prescribed elastic transformation. Preferably, in order to facilitate the housing cover 103 to be attached to the housing 101, corners of the locking sill 103b and/or the locking projections 103a can be rounded.

Meanwhile, the housing cover 103 may be configured to slide to be attached to and/or detached from the opening 101a of the housing 101 [not shown in the drawings]. In this case, guide grooves may be provided to inner lateral sides of the housing 101 to enable both lateral sides of the housing cover 103 to slide thereon, respectively.

Referring to FIG. 8B, the housing may include an insertion slot into which the flexible connecting member is inserted to be connected with the main printed circuit board. When the housing cover 103 is locked up to the housing 101, the insertion slot may be provided to an end portion of the housing cover 103, i.e., between the housing cover 103 and the housing 101. And, the housing cover 103 may further include a battery guide 108 provided to a side confronting the insertion slot 104 in order for a battery B not to move.

Thus, if the housing cover 103 is detachably provided to the bottom side of the housing 101, when at least one of the main printed circuit board 105, the control unit and the wireless communication module(s) is damaged or malfunctions, the maintenance and replacement of the control unit and/or the wireless communication module can be facilitated.

Referring to FIGS. 5 to 9B, the housing 101 may include the battery opening configured to open one lateral side of the housing 101 and the battery cover 110 detachably attached to the housing 101 to cover the battery opening.

In particular, if the battery B is the external battery B, the battery opening enables the battery B to be inserted in or separated from the battery receiving part 106 of the housing 101.

Referring to FIG. 9A and FIG. 9B, the battery cover 110 may be detachably provided to one lateral side of the housing 101. In particular, the battery cover 110 may include a support portion 104b vertically extending from a cover body and a fixing projection 104c provided to an end portion of the support portion 104b.

In order to facilitate attachment and detachment of the battery cover 110, the fixing projection 104c may be provided with an inclining surface on a face in an inserted direction and a locked surface extending from the inclining surface to be engaged with one lateral side of the housing 101 may be rounded.

A recess 104a may be provided to each of both lateral sides of the battery cover 110 to prevent the battery cover 110 from sliding in being attached/detached or to facilitate detachment/attachment of the battery cover 110.

The power button 102 may be provided to the other lateral side (i.e., a lateral side opposing the lateral side to which the battery cover 110 is attached) of the housing 101. The power button 102 is formed of light transmittive or semi-transmittive material. And, LED may be provided to an inside of the power button 102.

In particular, the LED may be configured to change in color in accordance with a remaining power level of the battery B under the control of the control unit. For instance, if the remaining power level of the battery B is 70% to 100% of a full charge level, the power button 102 may be configured to emit a green light from the LED. For another instance, if the remaining power level of the battery B is 30% to 70% of a full charge level, the power button 102 may be configured to emit an orange light from the LED. For another instance, if the remaining power level of the battery B is 1% to 30% of a full charge level, the power button 102 may be configured to emit a red light from the LED.

The flexible connecting member 300 is detachably attached to one side of the body part 100. In particular, the flexible connecting member 300 is drawn out via a slot provided between the housing 101 and the housing cover 103. The flexible connecting member 300 is fixed within the housing 101. And, the flexible connecting member 300 is electrically connected to the main printed circuit board 105 via 24- to 30-pin connector.

Reference indications P1, P2, P3 and P4 shown in FIG. 5 indicate positions at which a plurality of the key assemblies are connected to the flexible connecting member 300, respectively.

Meanwhile, a display unit (not shown in the drawings) may be provided to one side of the body part 100 (not shown in the drawing). In this case, information on a status of the portable keyboard may be displayed on the display unit. In particular, the control unit of the body part 100 may control the display unit to display the information on the status of the portable keyboard 1000.

In this case, the information on the status of the portable keyboard 1000 may include at least one of information on a remaining power level of the battery B, information on a signal strength of the wireless communication module, information on a type of a mobile terminal connected to the portable keyboard 1000 by wireless communication and the like for example, by which the present invention may be non-limited.

Figure 10:
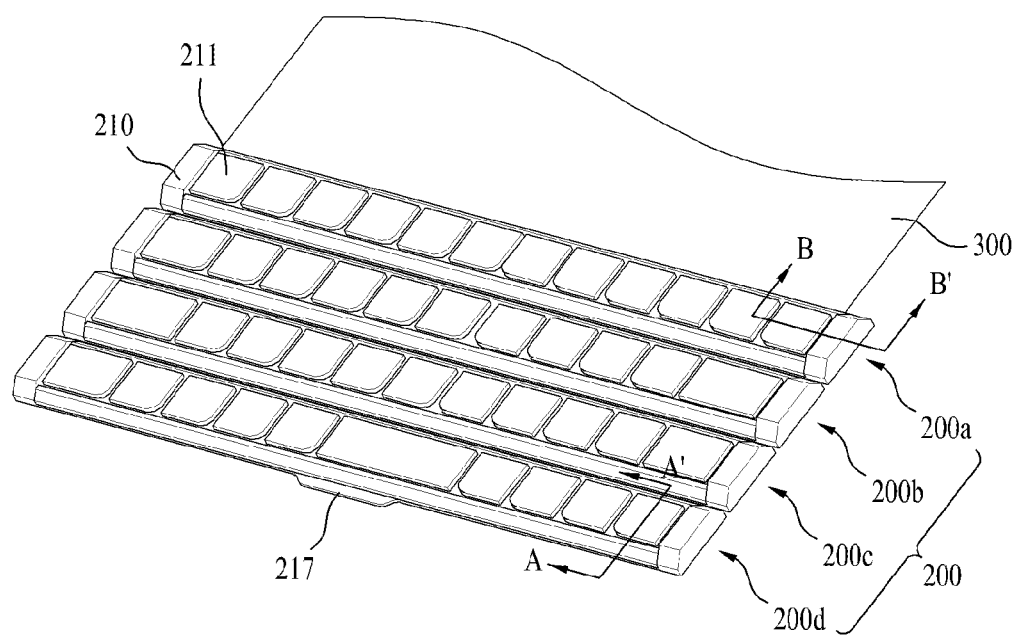
FIG. 10 is a schematic perspective diagram of a key assembly of a portable keyboard according to the present invention.
Figure 11:
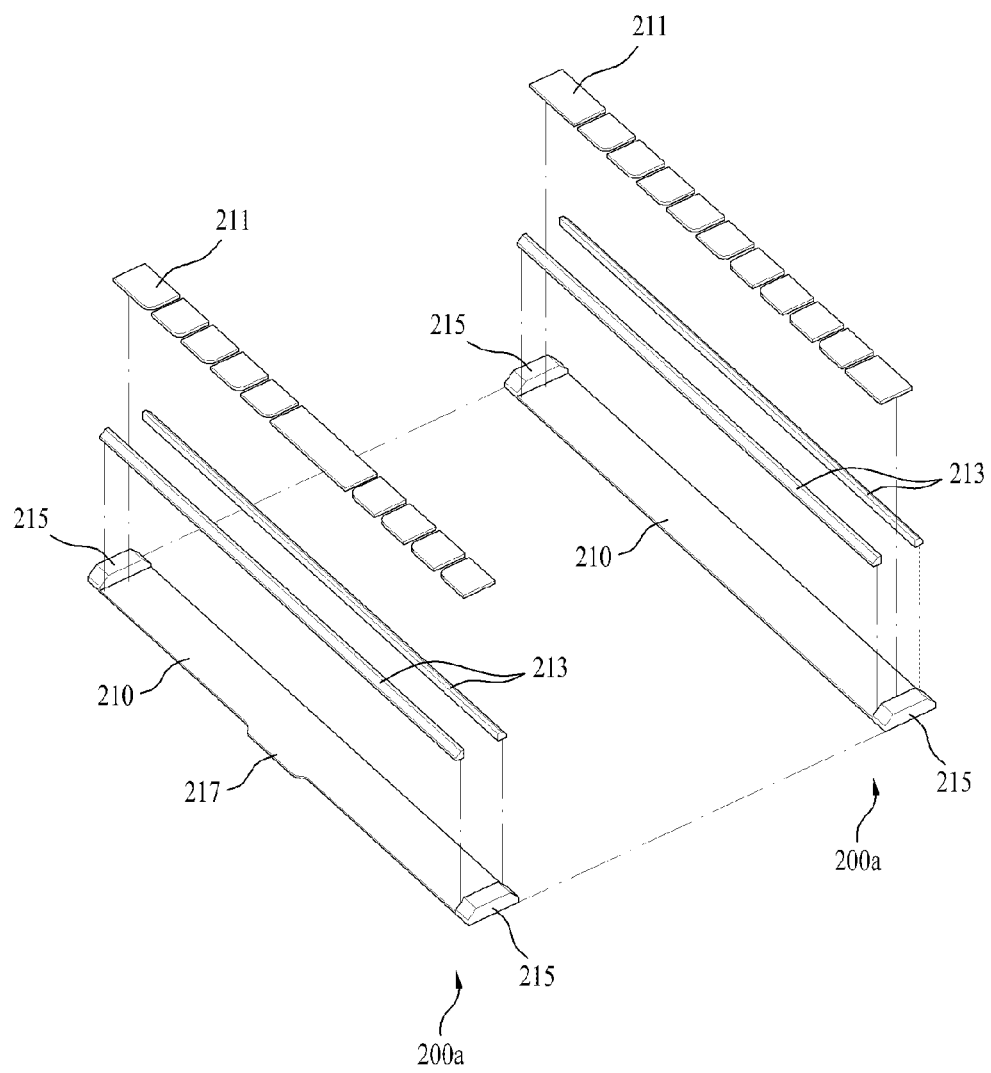
FIG. 11 is a schematic exploded perspective diagram of a key assembly of a portable keyboard according to the present invention.
Figure 12A:
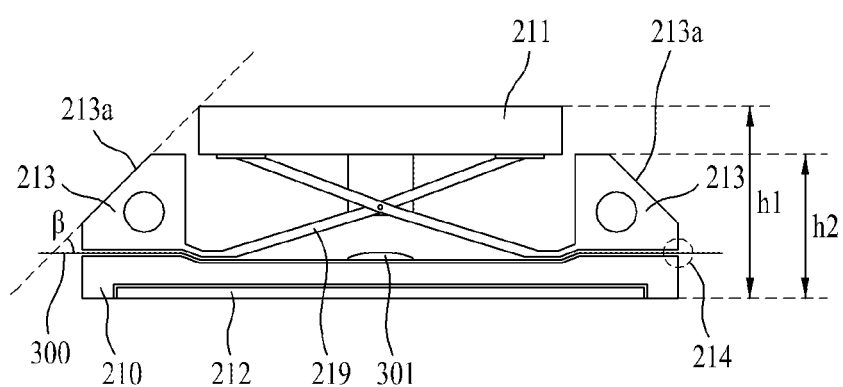
FIG. 12A and FIG. 12B are schematic cross-sectional diagrams of A-A' of a key assembly of FIG. 10.
Figure 12B:
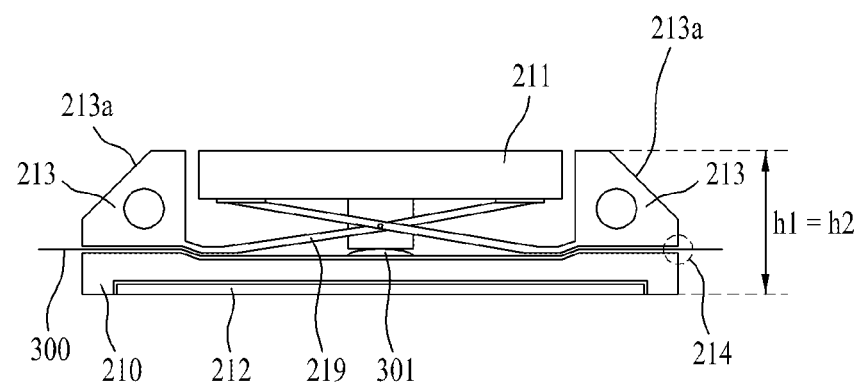
Figure 13:
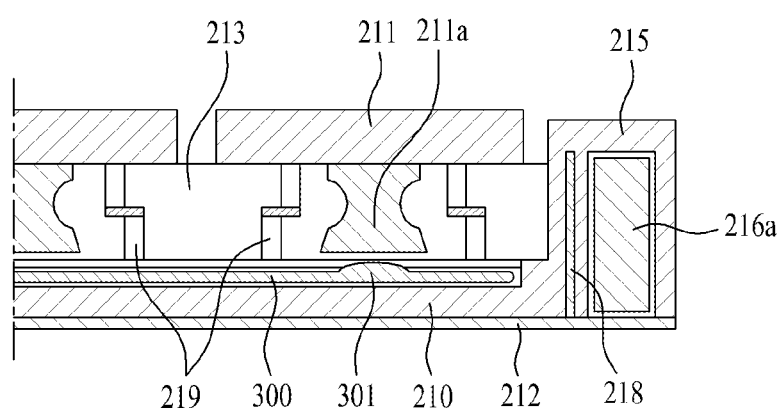
FIG. 13 is a schematic cross-sectional diagrams of B-B' of a key assembly of FIG. 10
Figure 14:
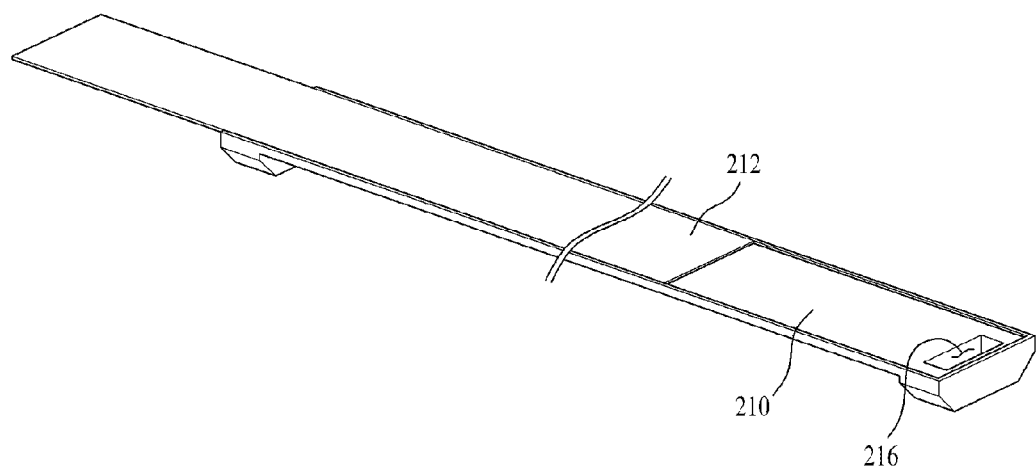
FIG. 14 is a schematic perspective diagram for a bottom side of a frame of a portable keyboard according to the present invention.

FIG. 10 is a schematic perspective diagram of a key assembly of a portable keyboard according to the present invention. FIG. 11 is a schematic exploded perspective diagram of a key assembly of a portable keyboard according to the present invention. FIG. 12A and FIG. 12B are cross-sectional diagrams in view of direction A-A' of the key assembly shown in FIG. 10. FIG. 13 is a cross-sectional diagram in view of direction B-B'. And, FIG. 14 is a schematic perspective diagram for a bottom side of a frame of a portable keyboard according to the present invention.

Referring to FIGS. 10 to 13, each of a plurality of key assemblies may include a frame 210 on which a flexible connecting member 300 and a plurality of keytops 211 are mounted, a pair of horizontal sidewalls respectively attached to a pair of horizontal top edges of the frame 210, and a pair of vertical sidewalls 215 respectively attached to a pair of vertical top edges of the frame 210.

The frame 2100 plays a role in supporting the key assemblies. And, the flexible connecting member 300 is mounted on a top surface of the frame 210. And, a plurality of the keytops 211 are arranged on the flexible connecting member 300. In this case, the frame 210 is an elongated member.

At the frame 210 of the key assembly, which is located farthest from the body part 100 in an unfolded state of the portable keyboard 1000, among a plurality of the key assemblies, an unfolding protrusion 217 is formed outward to facilitate a user to unfold the key assemblies of the portable keyboard 1000 that is rolled up to be carried.

A plurality of elastic members 219 are provided to the top surface of the frame 210 to elastically support a plurality of the keytops 211, respectively.

Each of the elastic members 219 may include a pair of links configured to cross with each other. A sliding member configured slidable on a bottom surface of the keytop 211 and a sliding member configured slidable on a top surface of the frame 210 are provided to both ends of each of the links, respectively. And, a spring may be provided to an end portion of the sliding member.

Alternatively, the elastic member 219 (not shown in the drawings) may include a compression spring connected to the bottom surface of the keytop 211 and the top surface of the frame 210.

Referring to FIG. 12A and FIG. 12B, when the keytop 211 is pressed, the elastic member 219 is configured to elastically descend down only up to a position at which the top surface of the keytop 211 reaches the same plane of the top surface of the horizontal sidewall 213. In particular, when the keytop 211 is pressed, the elastic member 219 is configured to elastically descend down until a height h1 of the top surface of the keytop 211 is equal to a height h2 of the top surface of the horizontal sidewall 213. If the elastic member 219 includes a pair of the aforementioned links, this can be implemented in a manner that a displacement of the sliding member is restricted. Alternatively, if the elastic member 219 includes the aforementioned compression spring, this can be implemented in a manner that an elastic constant and compression ratio of the compression spring.

Thus, when the keytop 211 is pressed, the elastic member 219 is configured to enable the top surface of the keytop 211 to elastically descend down only to the position at which the top surface of the keytop 211 reaches the same plane of the top surface of the horizontal sidewall 213. Therefore, when the keytop 211 is pressed, such configuration prevents a fingernail to hit the horizontal sidewall 213, thereby enhancing user's convenience and preventing the fingernail from damaged.

As mentioned in the foregoing description, the body part 100 includes the housing 101 having the hollow type n-polygonal cylinder shape. Moreover, when the portable keyboard 1000 is carried, the key assemblies are configured to enable the portably keyboard 1000 to have the n-polygonal cylinder shape in a manner that the key assemblies enclose the housing 101 of the n-polygonal cylinder shape. To this end, a cross-section of the key assembly has a trapezoid shape. And, an angle β between a sidewall and a bottom side of the trapezoid shape becomes [180*(n−2)/2n], as shown in FIG. 12A.

In this case, referring to FIG. 12A and FIG. 12B, the cross-section of the key assembly can become a cross-section of a part in which the frame 210, the horizontal sidewall 213 and the keytop 211 are assembled together or a cross-section at the vertical sidewall 215 provided to the frame 210. And, the cross-section of the part, in which the frame 210, the horizontal sidewall 213 and the keytop 211 are assembled together, may become the same cross-section of the vertical sidewall 215 when the keytop 211 is pressed.

For instance, referring to FIG. 3, FIG. 4, FIG. 12A and FIG. 12B, if the body part 100 has a square cylinder shape (i.e., n=4), a quantity of a plurality of the key assemblies becomes 4 and a cross-section of the key assembly is determined in a manner that the angle β between a sidewall side and a bottom side of the cross-section (i.e., a cross-section of the trapezoid shape) becomes 45 degrees.

On the frame 210, a pair of the horizontal sidewalls 213 opposing each other are fixed to left and right edges of the frame 210, respectively.

In this case, the horizontal sidewall 213 is connected in a manner of being spaced apart from the top surface of the frame 210 at a prescribed height to enable the flexible connecting member 300 to be inserted in and/or drawn from the key assemblies [cf. the reference number 214 shown in FIG. 12A]. For instance, both end portions of the horizontal sidewall 213 are fixed to the top surface of the frame 210 only and the rest of the horizontal sidewall 213 can be placed in a manner of being spaced apart from the top surface of the frame 210 at a prescribe height.

The horizontal sidewall 213 includes an inclining portion 213a configured to incline outward. And, the inclining portion 213a forms a part at which a plurality of the key assemblies come in contact with one another when a plurality of the key assemblies are folded by being rolled up centering on the body part 100 to carry the portable keyboard 1000. As mentioned in the foregoing description, an inclination angle of the inclining portion 213a is the angle β between a sidewall side and a bottom side of the trapezoid shape corresponding to the cross-section of the key assembly and becomes [180*(n−2)/2n].

On a top of the frame 210, a pair of the vertical sidewalls 215 are built in one body of top and bottom edges (i.e., vertical edges) of the frame 210 to oppose each other, respectively. A magnet receiving part 216 is provided within the vertical sidewall 215 and a magnet 216a is received in the magnet receiving part 215. In particular, as the vertical sidewalls 215 of each of the key assemblies are fixed to each other by the attractive force between the neighboring magnets 216a, a plurality of the key assemblies can be set stationary in a manner of being rolled up to enclose the body part 100 in carrying the portable keyboard 1000. Moreover, in order to attach the key assembly and the body part 100 to each other, a metal member or magnet may be further provided to each of right and left end portions of the body part 100.

Referring to FIG. 13, the vertical sidewall 215 is provided with a magnetic force shield member 218 at a position within the vertical sidewall 215 spaced apart in a prescribed distance from the magnet 216a toward a center of the frame 210. Preferably, the magnetic force shield member is a plate member formed of metallic substance. If the magnetic force shield member is provided, it may be able to prevent the magnetic force of the magnet, which plays a role in fixing a plurality of the rolled-up key assemblies, from having bad influence (e.g., reduction of a key recognition rate, error in key recognition, disturbance, etc.) on an electric signal delivered by the flexible connecting member 300 including the FPCB.

The magnet may be provided within the horizontal sidewall 213 as well as the vertical sidewall 215.

Alternatively, referring to FIG. 14, a frame cover 212 may be provided to the bottom surface of the frame 210 in a manner of being detachably attached to the frame 210. In this case, the frame cover 212 may be inserted and fixed in a manner of sliding from one vertical sidewall 215 in direction of the other vertical sidewall 215. To this end, a sliding groove may be provided to a bottom edge of the frame 210 to guide the frame cover 212. As the frame cover 212 is provided, the insertion or replacement of the magnet 216a in the magnet receiving part 216 can be facilitated and a process for manufacturing the portable keyboard 1000 can be simplified.

Moreover, if the magnetic force of the magnet becomes weak, the maintenance of the portable keyboard 1000 can be facilitated.

As mentioned in the foregoing description, the present invention simplifies a structure or configuration of a portable keyboard. In particular, in order to connect components of a portable keyboard, the present invention does not need a hinged connecting part (replaced by a flexible connecting member). When a portable keyboard is carried, the present invention does not need such a fixing device (replaced by a magnet) as a fixing projection, a fixing recess and the like in order to maintain a shape of the carried portable keyboard. Therefore, the present invention is able to simplify the structure or configuration of the portable keyboard, thereby improving a manufacturing speed of the portable keyboard and reducing a manufacturing cost of the portable keyboard.

When a portable keyboard is carried, the present invention enables an exterior shape of the carried portable keyboard to become a square pillar (i.e., a bar shape), thereby enhancing portability and storage convenience of the portable keyboard.

When a portable keyboard is carried, the present invention has no protrusions from an exterior surface of the portable keyboard and does not need to use a hinged connecting part, thereby enhancing the beauty sense of the portable keyboard.

Accordingly, the present invention provides the following effects and/or advantages.

First of all, according to at least one of embodiments of the present invention, the present invention simplifies a structure or configuration of a portable keyboard, thereby improving a manufacturing speed of the portable keyboard and reducing a manufacturing cost of the portable keyboard.

Secondly, when a portable keyboard is carried, the present invention enables an exterior shape of the carried portable keyboard to become a square pillar (i.e., a bar shape), thereby enhancing portability and storage convenience of the portable keyboard.

Thirdly, when a portable keyboard is carried, the present invention has no protrusions from an exterior surface of the portable keyboard and does not need to use a hinged connecting part, thereby enhancing the beauty sense of the portable keyboard.

Accordingly, the present invention is directed to a portable keyboard that substantially obviates one or more problems due to limitations and disadvantages of the related art.

An object of the present invention is to provide a portable keyboard, by which the portable keyboard can be provided with a simple configuration.

Another object of the present invention is to provide a portable keyboard, by which portability and storage efficiency can be improved.

A further object of the present invention is to provide a portable keyboard, by which the exterior beauty of the portable keyboard can be enhanced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable keyboard according to the present invention may include a plurality of key assemblies including a plurality of keytops arranged in a straight line in horizontal direction, a plurality of the key assemblies arranged side by side in vertical direction, a body part situated side by side next to a last row of a plurality of the key assemblies arranged side by side to process an input signal inputted from each of a plurality of the key assemblies, and a flexible connecting member electrically connecting a plurality of the key assemblies and the body part with each other, the flexible connecting member mechanically connecting a plurality of the key assemblies and the body part with each other to enable a plurality of the key assemblies to enclose an outer circumference of the body part in a manner that a plurality of the key assemblies are folded in-between and that the body part and the corresponding key assembly right next to the body part are folder in-between.

Preferably, the number of a plurality of the key assemblies is n, the body part has an n-polygonal cylinder shape, and a top side of each of the key assemblies is rolled up in a manner of coming in contact with each face of the body part.

Preferably, the key assembly includes a frame having the flexible connecting member and a plurality of the keytops mounted thereon, a pair of horizontal sidewalls respectively attached to a pair of horizontal top edges of the frame, and a pair of vertical sidewalls respectively attached to a pair of vertical top edges of the frame.

More preferably, a magnet is provided to an inside of the vertical sidewall and a plurality of the key assemblies are folded and fixed by a magnetic force of the magnet in a manner of being rolled up to enclose the body part when the portable keyboard is carried.

In this case, a magnetic force shield member at a position spaced apart in a prescribed distance from the magnet toward a center of the frame is provided within the vertical sidewall.

The vertical sidewall includes a magnet receiving part having a bottom side open to have a magnet arranged therein and the frame includes a frame cover configured detachable from a bottom side of the frame to open/close the bottom side of the magnet receiving part.

More preferably, the horizontal sidewall is connected in a manner of being spaced apart from a top surface of the frame at a prescribed height to enable the flexible connecting member to be inserted in and/or drawn from the key assembly.

More preferably, the horizontal sidewall includes an inclining portion configured to incline outward.

In this case, the number of a plurality of the key assemblies is n, the body part has an n-polygonal cylinder shape, and an inclining angle of the inclining portion is $[180*(n-2)/2n]$.

More preferably, an elastic member is provided to a top surface of the frame to elastically support each of a plurality of the keytops.

Preferably, the body part includes a housing having a hollow cylinder shape corresponding to a horizontal length of the key assembly and a main printed circuit board provided within the housing, the main printed circuit board electrically connected to the flexible connecting member, the main printed circuit board having a control unit controlling the input signal mounted thereon, wherein the housing comprises an insertion slot in which the flexible connecting member is inserted to be connected with the main printed circuit board.

More preferably, the housing includes an opening configured to open one side of the housing and a housing cover detachably attached to the housing to cover the opening, wherein the insertion slot is provided to an end portion of the housing cover.

More preferably, the body part includes a battery configured to supply power to the main printed circuit board and the housing includes a battery opening provided to one lateral side of the housing, a battery receiving part configured to receive the battery via the battery opening, and a battery cover detachably attached to the housing to cover the battery opening.

More preferably, the body part further includes a wireless communication module mounted on the main printed circuit board to transmit the input signal to the mobile terminal.

More preferably, the body part further includes a display unit and the control unit controls the display unit to display information on a status of the portable keyboard.

In this case, the information on the status of the portable keyboard includes at least one of information on a remaining power level of the battery, information on a signal strength of the wireless communication module and information on a type of the mobile terminal connected to the portable keyboard by wireless communication.

Preferably, the flexible connecting member includes a flexible printed circuit board (FPCB) configured to transmit the input signal from each of a plurality of the key assemblies to the body part.

Preferably, an unfolding protrusion configured to protrude outward is provided to a frame of the key assembly situated most distant from the body part among a plurality of the key assemblies when a plurality of the key assemblies are unfolded.

Preferably, the flexible connecting member is detachably attached to bottom surfaces of a plurality of the key assemblies and the body part.

Preferably, the body part is provided with a power button to control ON/OFF of the portable keyboard, wherein the power button is formed of light transmittive or semi-transmittive substance, the power button comprises an LED, and the LED is configured to change color or brightness in accordance with a remaining power level of the battery configured to supply power to the portable keyboard.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable keyboard comprising:
   a plurality of key assemblies, each key assembly including a frame and a corresponding plurality of keytops;
   a body part provided adjacent to a first one of the key assemblies located at a first end among the plurality of key assemblies, the body part has a plurality of side surfaces arranged in a polygonal cylinder shape;
   a connecting member to couple the plurality of key assemblies and the body part,
   wherein the plurality of keytops of each separate one of the key assemblies contacts a separate corresponding one of the side surfaces of the body part in a first transform state,
   wherein the portable keyboard is provided in a polygonal cylinder shape in the first transform state.

2. The portable keyboard of claim 1, further comprising:
   an unfolding protrusion protruding outward at a second one of the key assemblies located at a second end among the plurality of key assemblies.

3. The portable keyboard of claim 1, wherein a bottom of each one separate one of the plurality of key assemblies and a separate corresponding side surface of the body part are provided at same plane in a second transform state.

4. The portable keyboard of claim 1, further comprising:
   a first magnet provided at each of the plurality of key assemblies; and
   a second magnet provided at a portion of the body part corresponding with the first magnet when the connecting member folds and one of the plurality of the key assemblies covers at least a portion of the side surface of the body part,
   wherein a magnetic pole of the second magnet is opposite a magnetic pole of the first magnet.

5. The portable keyboard of claim 4, wherein the key assembly includes:
   a pair of horizontal sidewalls respectively attached to horizontal top edges of the frame; and
   a pair of vertical sidewalls respectively attached to vertical top edges of the frame.

6. The portable keyboard of claim 5, wherein the first magnet provided to an inside of one of the vertical sidewalls, and wherein the plurality of key assemblies are folded and attached by a magnetic force of the first magnet when the connecting member is rolled up to cover at least two portions of the body part.

7. The portable keyboard of claim 6, wherein the key assembly further includes a magnetic force shield member provided in the one of the vertical sidewalls, and the magnetic force shield member is spaced apart from the first magnet toward a center of the frame.

8. The portable keyboard of claim 6, wherein the vertical sidewall includes a magnet receiving part having a bottom to open to have the first magnet arranged therein, and the frame includes a frame cover to detach from a bottom of the frame to open/close the bottom of the magnet receiving part.

9. The portable keyboard of claim 5, wherein the horizontal sidewall is spaced from a top of the frame at a prescribed height to enable the connecting member to be inserted in and/or drawn from the key assembly.

10. The portable keyboard of claim 5, wherein the horizontal sidewall includes an inclining portion to incline outward.

11. The portable keyboard of claim 5, wherein the key assembly further includes an elastic member provided to a top of the frame to elastically support each of the plurality of keytops.

12. The portable keyboard of claim 1, wherein the body part comprises:
   a housing having a hollow cylinder shape corresponding to a horizontal length of the key assemblies; and
   a circuit board provided within the housing, the circuit board to electrically connect to the connecting member, the circuit board having a control unit provided on the circuit board to receive a input signal,
   wherein the housing includes an insertion slot to receive the connecting member and to be connected to the circuit board.

13. The portable keyboard of claim 12, wherein the body part further comprises a wireless communication module on the circuit board to transmit the input signal to a mobile terminal.

14. The portable keyboard of claim 12, wherein the body part further comprises a display unit, wherein the control unit controls the display unit to display information on a status of the portable keyboard.

15. The portable keyboard of claim 14, wherein the information on the status of the portable keyboard includes at least one of information on a power level of a battery, information on a signal strength of the wireless communication module or information on a type of a mobile terminal connected to the portable keyboard by wireless communication.

16. The portable keyboard of claim 1, wherein a total number of the plurality of key assemblies is n, wherein the body part has an n-polygonal cylinder shape.

17. A keyboard comprising: a plurality of key assemblies, each key assembly including a corresponding plurality of keytops; a body part provided adjacent to a first one of the key assemblies located on a first end of the plurality of key assemblies, the body part has a plurality of periphery surfaces of a polygonal cylinder; and a flexible connecting member to electrically connect the body part to each of the plurality of key assemblies, wherein a top of each of the plurality of keytops of each separate one of the key assemblies face a separate corresponding periphery surface of the body part in a first-transform state, and the top of each of the plurality of keytops is exposed to outside of the keyboard in a second transform state, wherein the portable keyboard is provided in a polygonal cylinder shape in the first transform state.

18. The keyboard of claim 17, wherein each of the plurality of key assembly includes:
   a frame having the flexible connecting member and the corresponding plurality of keytops provided thereon;
   first sidewalls respectively attached to first top edges of the frame; and
   second sidewalls respectively attached to second top edges of the frame.

19. The keyboard of claim 18, wherein each of the plurality of key assembly further includes a magnet provided at an inside of one of the second sidewalls, and wherein the plurality of key assemblies are folded and attached by a magnetic force of the magnet when the key assemblies are rolled up to cover the body part.

20. The keyboard of claim 19, wherein the second sidewall includes a magnet receiving part having a bottom to open to have a magnet arranged therein, and the frame includes a frame cover to detach from a bottom of the frame to open/close the bottom of the magnet receiving part.

* * * * *